(12) United States Patent
Klöpper (10) Patent No.: US 9,846,100 B2
(45) Date of Patent: Dec. 19, 2017

(54) DEVICE AND METHOD FOR DETERMINING INERTIA PROPERTIES OF AN OBJECT

(71) Applicant: Resonic GmbH, Berlin (DE)

(72) Inventor: Robert Klöpper, Berlin (DE)

(73) Assignee: Resonic GmbH, Berlin (DE)

( * ) Notice: Subject to any disclaimer, the term of this patent is extended or adjusted under 35 U.S.C. 154(b) by 0 days.

(21) Appl. No.: 14/891,031

(22) PCT Filed: May 13, 2014

(86) PCT No.: PCT/EP2014/059787
§ 371 (c)(1),
(2) Date: Nov. 13, 2015

(87) PCT Pub. No.: WO2014/184201
PCT Pub. Date: Nov. 20, 2014

(65) Prior Publication Data
US 2017/0059439 A1   Mar. 2, 2017

(30) Foreign Application Priority Data

May 14, 2013 (DE) .................. 10 2013 208 875

(51) Int. Cl.
*G01M 17/00* (2006.01)
*G01M 1/10* (2006.01)
*G01B 11/14* (2006.01)

(52) U.S. Cl.
CPC ............. *G01M 1/10* (2013.01); *G01B 11/14* (2013.01)

(58) Field of Classification Search
None
See application file for complete search history.

(56) References Cited

U.S. PATENT DOCUMENTS

| 3,418,847 A | 12/1968 | Nantz |
| 5,177,998 A | 1/1993 | Monk |
| 8,505,373 B2 * | 8/2013 | Goertz ............... G01M 1/10 73/116.01 |
| 2003/0230137 A1 | 12/2003 | Kemp et al. |
| 2006/0010965 A1 | 1/2006 | Mastinu et al. |
| 2012/0324991 A1 | 12/2012 | Goertz et al. |

(Continued)

FOREIGN PATENT DOCUMENTS

| FR | 2712085 | 5/1995 |
| JP | H0688763 | 3/1994 |
| KR | 101177776 | 8/2012 |

(Continued)

OTHER PUBLICATIONS

"International Application No. PCT/EP2014/059787, International Search Report and Written Opinion mailed Jul. 24, 2014", (Jul. 24, 2014), 11 pgs.

(Continued)

*Primary Examiner* — Andre Allen
(74) *Attorney, Agent, or Firm* — Schwegman Lundberg & Woessner, P.A.

(57) ABSTRACT

The present application relates to devices for determining inertia properties of an object, said devices comprising a support and a measuring platform which are arranged relative to each other in such a way that movements between two and five degrees of freedom are possible.

15 Claims, 7 Drawing Sheets

(56) References Cited

U.S. PATENT DOCUMENTS

2013/0036801 A1* 2/2013 Bingham ............... G01M 1/10
                                                                                 73/65.08

FOREIGN PATENT DOCUMENTS

| RU | 2368880 | 9/2009 |
| --- | --- | --- |
| RU | 2434213 | 11/2011 |
| WO | WO-2012/163688 | 12/2012 |
| WO | WO-2014/184201 | 11/2014 |

OTHER PUBLICATIONS

"International Application No. PCT/EP2014/059787, International Preliminary Report on Patentability mailed Nov. 26, 2015", 8 pgs.

* cited by examiner

Fig. 4h

DEVICE AND METHOD FOR DETERMINING INERTIA PROPERTIES OF AN OBJECT

PRIORITY CLAIM TO RELATED APPLICATIONS

This application is a U.S. national stage application filed under 35 U.S.C. §371 from International Application Serial No. PCT/EP2014/059787, which was filed 13 May 2014, and published as WO2014/184201 on 20 Nov. 2014, and which claims priority to Germany Application No. 10 2013 208 875.2, filed 14 May 2013, which applications and publication are incorporated by reference as if reproduced herein and made a part hereof in their entirety, and the benefit of priority of each of which is claimed herein.

TECHNICAL FIELD

The subject-matter of the present invention is a device according to the independent claims, as well as a method according to the further independent claims.

BACKGROUND OF THE INVENTION

Inertia measurements for determining inertia characteristics of an object with a spatial mass distribution (in contrast to point masses) serve for the simulation or prediction of the dynamic behaviour of the object, such as a car for example. Information for example concerning the dynamic handling of a car is provided by way of determining the inertia characteristics, i.e. the mass, the centre of gravity as well as the moments (moments of inertia and/or moments of deviation) of the inertia tensor. Numerous industrial applications for determining inertia characteristics are known in the state of the art.

One device which is known in the state of the art for example is the device "Resonic 100" or "Resonic 350" of Resonic GmbH. The device comprises a carrier as well as a measurement platform and a plurality of spring elements which are arranged between the measurement platform and the carrier. The object to be measured is placed on the measuring platform and the measurement platform is deflected [out] by a random knock, so that the measurement platform subsequently freely oscillates. The inertia characteristics of the object placed on the measurement platform can be subsequently determined by way of the measuring of the frequency spectrum of the free oscillations. A measurement platform is hereinafter to be understood as a rigid receiver for the object to be measured.

A further device for determining inertia characteristics is known from US 2012/0324991. The device comprises a carrier, a measurement platform and a spherical joint which is arranged between the measurement platform and the carrier. The measurement platform is then actively moved (by way of actuators) and the forces which thereby act are determined via force sensors. Inertia characteristics of the object to be measured can then be determined from the force measurements and the measurement of the movement of the platform.

SUMMARY

It is the object of the present invention, to provide a device for determining inertia characteristics, which offers an alternative and/or an improvement with respect to the devices which are already known from the state of the art. This object is achieved by the devices of the independent claims and by way of the method of the further independent claims.

A first aspect of the invention encompasses a device with a carrier, with a measurement platform for arranging the object, as well as with a plurality of restoring elements arranged between the measurement platform and the carrier. The measurement platform is movable in up to five degrees of freedom with respect to the carrier (but not in six degrees of freedom) and a bearing arrangement and/or joint arrangement is arranged between the carrier and the measurement platform, in a manner such that this permits a movement of the measurement platform with respect to the carrier in at least two degrees of freedom, preferably at least three degrees of freedom.

The bearing arrangement and/or joint arrangement permits a movement of the measurement platform with respect to the carrier in between two and five degrees of freedom. The restoring elements are arranged between the carrier and the measurement platform, in a manner such that the measurement platform can freely oscillate about an equilibrium position. The restoring elements hereby are therefore to be understood as passive restoring elements, and not as actuators which transmit an active movement upon the measurement platform. The device according to the application oscillates freely as soon as this has been deflected once for example. The measurement of the frequency spectra of the free oscillations provides information on the inertia characteristics. A permanent, forced oscillation is not necessary. With n degrees of freedom, the natural frequencies and amplitudes of the n oscillations are preferably detected at least at n measurement points when measuring an object.

The bearing arrangement and/or joint arrangement (hereinafter bearing arrangement) is suitable for accommodating the static load of the object which is to be arranged on the measurement platform and is to be measured. The position or orientation of the measurement platform is independent of the object to be measured due to the arrangement of the object directly above the bearing arrangement. The effect of the stiffness and inertia of the restoring elements which permit the free oscillations is thus essentially the same for each object to be measured. Moreover, the static load of the object, which is to say the weight, bears on the bearing arrangement and/or joint arrangement and not on the restoring elements as is the case for example with the hitherto existing devices of Resonic GmbH. The restoring elements can be selected infinitely soft or hard since the load of the object to be measured from now is carried by the bearing arrangement and/or joint arrangement, so that highly elastic test objects, such as satellites for example, can be measured, since the natural frequencies of the free oscillations can be set almost infinitely low.

A calibration of the device, which is to say the evaluation of the total stiffness matrix of the restoring elements together with the combined mass matrix of restoring elements and measurement platform is moreover possible for example by way of a one-off calibration measurement. The mathematical model of the suspension of the measurement platform is not dependent on the object to be measured, since the calibration can be carried out independently of the test object and the orientation or position of the measurement platform is independent of the object to be measured, provided that the load of this lies above the bearing arrangement. This is in contrast to earlier devices, with which the calibration could not be carried out independently of the object to be measured, but had to be computed from the characteristics of the individual springs. Hereby, the modelling was only possible or practical for certain springs. Thus for example it is no longer necessary to exclusively apply tension springs with the present device, but one can likewise also fall back on other passive restoring elements.

In contrast to the state of the art, in which tension springs are applied as passive restoring elements, with the device of the present application it is no longer necessary to exclusively apply these, but other restoring elements are also possible. The space around the measurement platform is restricted with the application of tension springs according to the state of the art, since the tension springs suspend the measurement platform and thus the centre of gravity of the measurement platform lies below the upper suspension point of the tension springs. The size of the object to be measured however by way of this is essentially limited to a dimension which is smaller than the dimension of the measurement platform. The object can be formed larger than the measurement platform, and a centre of gravity of the measurement platform, in particular a centre of gravity of the object to be measured can lie above the suspension points of the restoring elements due to the fact that the present invention also permits other types of restoring elements. Measurement platforms which have a small inertia compared to the object to be measured can be applied on account of this, and thus the inertia characteristics of the object can be measured more accurately.

With regard to the restoring elements, it can be the case for example of compression springs, tension springs, leaf springs, helical springs, conical springs, torsion springs, spiral springs, disc springs, or similar springs which are known from the state of the art. Other passive restoring elements however are also possible, such as for example air-filled cylinders, in which a piston is led, wherein a loading of the piston/plunger compresses the air mass held in the cylinder and pressure oscillations occur in the cylinder. Further restoring elements can be deduced from the state of the art.

With regard to the carrier, for example it can be the case of a floor of a room or of a frame which is separate from the room and which can be connected to parts of a room or on account of its mass can be arranged in a spatially fixed manner during a measurement of inertia characteristics.

With regard to the measurement platform for arranging the object, it can be the case for example of a frame or a mount, which is connected to the carrier via the restoring elements and, in this aspect, preferably independently thereof via the bearing arrangement and/or joint arrangement. I.e. the restoring elements connect the measurement platform to the carrier in a direct manner, so that the restoring elements are not connected to the bearing arrangement and/or joint arrangement. In one variant, the carrier itself can be connected to a further carrier or the room, via further bearing arrangements and/or joint arrangements or restoring elements, wherein the further carrier is preferably arranged below the carrier. The restoring elements between the carrier and the measurement platform are thereby arranged in a manner such that each individual restoring element can effect a restoring in more than one degree of freedom. In a further variant there are exclusively restoring elements between the further carrier and the measurement platform.

The measurement platform or the carrier can be manufactured of metals, composite materials (e.g. glass-fibre-reinforced plastic, carbon, aramide or Kevlar) or other sufficiently stiff materials and can be manufactured from hollow elements, solid carriers or components constructed in a sandwiched construction manner. The measurement platform as a whole is designed in a rigid manner, so that this forms a rigid body.

A plurality here is to be understood as a number of restoring elements which is equal to two or more than two.

Further embodiments of the first aspect of the application are disclosed in the dependent claims as well as the embodiment examples.

In an embodiment, the plurality of restoring elements is spring elements. Spring elements are comparatively simple to manufacture and can be made available for a wide field of application. The spring hardness can be selected according to the mass of the object to be measured, so that stiffer springs or additional springs can prevent an object arranged on the measurement platform from flipping over, for example given an object with a large product of mass and height of the centre of gravity. Objects, whose centre of gravity lies almost infinitely above the measurement platform can be measured in this manner. The natural frequencies of the free oscillations can be infinitely reduced by way of matching the springs to the mass and height of centre of gravity, so that extremely elastic test objects can be measured.

In a further embodiment, the bearing arrangement and/or joint arrangement is designed in a manner such that the measurement platform is fixed in a preferable vertical translatory movement direction with respect to the carrier, i.e. the measurement platform is mounted in a manner such that the measurement platform has a spatially fixed point given a deflection of this. The measurement platform as a whole cannot be translatorily displaced along the z-axis in the case of a fixation in the z-direction. As long as the measurement platform for example is fixed with respect to the carrier in the translatory movement direction, in the z-direction, which is to say in the direction of gravity, the bearing arrangement and/or joint arrangement is particularly suited for accommodating the static load of the object to be measured. The calibration of the system is simplified by way of this, as initially mentioned.

In a further embodiment, the plurality of restoring elements is selected in a manner such that the plurality is larger than or equal to a number of degrees of freedom, in which the measurement platform is freely movable. In this manner, it can be ensured that the restoring elements reliably prevent a flipping of the measurement platform.

In a further embodiment, the device comprises a plurality of restoring elements which accommodate vertical as well as horizontal forces.

In a further embodiment, the plurality of restoring elements comprises a first and a second group of restoring elements, wherein the first group of restoring elements is arranged in a manner such that these predominantly accommodate vertical forces, and the second group of restoring elements is arranged in a manner such these predominantly accommodate horizontal forces. The different groups of restoring elements are in the position of restricting different degrees of freedom of the movement of the measurement platform, due to the fact that the restoring elements can accommodate different forces. Thus vertical restoring elements are preferably suitable for accommodating degrees of freedom of rotation which are directed about the x-direction and y-direction which is to say about the plane perpendicular to gravity. Horizontal restoring elements are suitable for accommodating a translatory movement in the plane as well as rotations about the z-axis. A translatory movement which is directed in the z-direction as the case may be is likewise restricted by the first group.

In a further embodiment, the carrier is preferably arranged completely below the measurement platform. The carrier in this manner does not limit the size of the object to be measured, which can project beyond the measurement platform. It is possible to measure comparably large objects by way of this, so that the applications possibilities of the device are increased.

The measurement platform in one variant is connected to the bearing arrangement and/or joint arrangement in a manner such that the movement is simultaneously effected in the two to five degrees of freedom. I.e. several consecutive measurements, with which different degrees of freedom are excited in each case, are not necessary.

In a further embodiment, the bearing arrangement and/or joint arrangement comprises at least one air bearing. Air bearings amongst other things have the advantage that operated by way of compressed air for example, they can represent a low-friction bearing. They are moreover inexpensively obtainable on the market and have a high stiffness, so that the kinematics of the free oscillations reflects the characteristics of the object to be measured, in an essentially unadulterated manner. With regard to the air bearings, it can be the case for example of a plane air bearing or a spherical air bearing.

In a further embodiment, the bearing arrangement and/or joint arrangement comprises at least one spherical bearing and/or joint, a torsion bearing, a ball bearing, and/or cardanic bearing, which is arranged between the carrier and the measurement platform, in manner such that the measurement platform is movable in at least two degrees of freedom. It is possible for example to permit a rotation about the x-axis and y-axis, on account of the bearings mentioned above. Moreover, that point of the measurement platform, on which the bearing engages, serves as a support of the weight of the object to be measured, since the bearing or joint mentioned above prevents a movement for example along the z-axis.

In a further embodiment, the bearing arrangement and/or joint arrangement comprises a plane sliding bearing which is arranged in a manner such that the measurement platform is movable in at least three degrees of freedom. Thereby, it can be the case of two translatory directions within the plane and a rotation about the z-axis. However, plane sliding bearings which only permit a single translatory direction or exclusively a rotation about the z-axis are also possible.

Hereby, it is to be mentioned that the different bearings can be combined with one another, so that between two and five degrees of freedom of the measurement platform are available for the measurement of the inertia characteristics of the object to be measured.

In another embodiment, the bearing arrangement and/or joint arrangement comprises a device for adjustment, so that the bearing arrangement can be fixed in a predefined position with respect to the carrier and/or the measurement platform. The predefined position is preferably a "zero position" which is to say a certain alignment of the components of the bearing arrangement with respect to the measurement platform or the carrier is given in this position. In this manner, it is ensured that the above-mentioned calibration of the device can be applied out of this "zero position". The provision of the "zero position" is thus a hardware calibration.

In a further embodiment, the bearing arrangement and/or joint arrangement is designed in a manner such that a centre of gravity of the measurement platform is arranged directly above or below the centre of gravity of the measurement platform.

In a further embodiment, a gravity pendulum arrangement is arranged on the measurement platform, and this can add further degrees of freedom, additionally to the degrees of freedom which can be present by way of the movements between the carrier and the measurement platform. However, the limitation of the measurement platform being limited in at least one degree of freedom with respect to the carrier continues to be present.

In a further embodiment, the device comprises a multitude of sensors, in order, with regard to measurement technology, to detect a movement of the measurement platform with respect to the carrier. The frequency spectrum of the oscillations can be determined by way of the detection of the movement of the measurement platform with respect to the carrier, and thus the centre of gravity as well as the mass can be preferably determined from the natural frequencies and amplitudes, of the oscillation of the inertia tensor.

Only a subset of ten parameters (six parameters of the inertia tensor, three parameters of the centre of gravity, and the mass) can be determined if the number of degrees of freedom, in which the measurement platform can be moved, is reduced to less than five degrees of freedom, and one must have a prior knowledge concerning the object or several measurements must be carried out, wherein the object must be aligned differently with respect to the carrier, between two measurements.

Preferably, the sensors are arranged on the carrier or on the measurement platform or extend on the measurement platforms well as on the carrier. Suitable sensors for example are laser distance sensors which by way of triangulation determine the distance of certain points of the carrier and of the measurement platform to one another and thus determine frequency spectra and amplitudes.

Although force sensors, accelerations sensors or gyroscope sensors can be applied, these however are not necessary and are also not envisaged for numerous embodiments.

The data of the sensors is preferably led further to a data bus arranged on the device, wherein the data bus is configured in a manner such that a wireless or wired connection channel to a data processing installation can be built up. The data bus is provided for coupling the device to a data processing installation, wherein the data of the sensors is transferred to the data processing installation by the data bus. In alternative embodiment, parts of the signal processing can be arranged in the device itself. This for example comprises an A/D converter.

The plurality of sensors can be selected in a manner such the number is larger than or equal to a number of degrees of freedom, in which the measurement platform is freely movable. The different natural frequencies and oscillation amplitudes can be well resolved by way of this.

A second aspect of the present invention relates to a device for determining inertia characteristics of an object, wherein the device comprises a carrier, a measurement platform for arranging the object, as well as a bearing arrangement and/or joint arrangement, which is arranged between the carrier and the measurement platform, in a manner such that the bearing arrangement and/or joint arrangement permits a movement of the measurement platform with respect to the carrier in at least two degrees of freedom.

In this aspect of the invention, the carrier is arranged above the measurement platform and the measurement platform is designed in a manner such that the object is arranged below the measurement platform. The bearing arrangement and/or joint arrangement is moreover connected to the carrier via a plurality of restoring elements, in a manner such that the bearing arrangement and/or joint arrangement is movable with respect to the carrier perpendicularly to a direction of the weight force in two degrees of freedom.

The arrangement or device of the second aspect with this thereby corresponds to a gravity pendulum, which can either oscillate in one or two degrees of freedom, wherein the suspension point of the gravity pendulum is movable in at least one additional degree of freedom. At least two degrees of freedom can be utilised by way of this, in order to determine the inertia characteristics of an object arranged below the platform. The bearing arrangement similarly to the first aspect of the application can comprise a ball joint bearing or cardanic bearing, which can be moved in at least two degrees of freedom. The restoring elements in a variant of the second aspect create a direct connection between the carrier and the bearing arrangement and/or joint arrangement, so that the bearing arrangement and/or joint arrangement for example is led in the x-y plane, i.e. the plane perpendicular to the gravity force, and by way of the restoring elements can be restored into an idle position within the x-y plane. A direct connection between the restoring elements and the measurement platform is not necessary in this variant and is not envisaged in numerous embodiment examples, since in this embodiment, with which the measurement object is arranged below the measurement platform, the gravity permits a restoring of the measurement object into the idle position.

It should be mentioned that analogously to the first aspect, not only can the carrier be a separate component, but also can also be formed by a room ceiling or likewise. Guides of the restoring elements are then fastened on the ceiling or likewise.

A third aspect of the invention concerns a method for calibrating a device described above, wherein a mass matrix of the measurement platform and of the plurality of restoring elements and a total stiffness matrix of the restoring elements are determined in a calibration method. Different measurements with different calibration objects which have known inertia characteristics are carried out for the calibration measurement. The calibration can be carried out as a one-off after the construction or manufacture of the device on account of this, and subsequently only needs to be carried out at regular, larger time intervals.

In a further embodiment of the invention, the carrier and/or the measurement platform each comprise an adapter which is designed in a manner such that this comprises a receiver in each case for at least one restoring element. The adapter is preferably designed in a manner such that a different number of restoring elements can be arranged. The adapter can thereby for example receive one, two, three or more restoring elements. This is of great use if the device is to be used for determining inertia characteristics of different objects, in particular of a large different mass and objects with large centre of gravity heights. The device can achieve the desired total stiffness suitable for the object to be measured, by way of adding restoring elements. A restoring element for example can be added for each adapter and in each case the total stiffness matrix can be determined within the framework of calibration measurement, for the different restoring elements. The device in this manner can be applied over a large parameter range of masses, centre of gravity heights and size of the object.

BRIEF DESCRIPTION OF THE DRAWINGS

Further embodiments of the invention are explained in more detail by way of the subsequent embodiment examples.

There are shown in.

DETAILED DESCRIPTION

Figure 1:
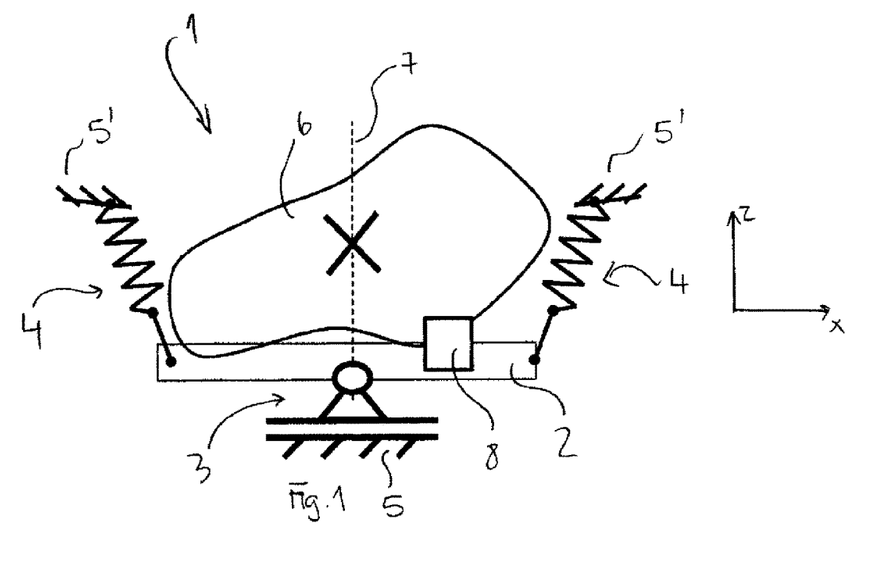
FIG. 1 a first embodiment of the device of the first aspect with tension springs.

FIG. 1 shows a device 1 which comprises a measurement platform 2, a bearing arrangement and/or joint arrangement 3 (hereinafter also only called bearing arrangement), as well as a plurality of restoring elements 4. The bearing arrangement 3 is furthermore connected to a "carrier" 5 which in the present case is merely a floor. The restoring elements 4 are likewise arranged on a wall 5' which can be part of the room, in which the carrier 5 is located. Alternatively, the bearing arrangement 3 can be arranged on a mount which likewise comprises the suspensions for the restoring elements 4.

An object 6 to be measured is arranged on the measurement platform 2, wherein the object 6 is arranged on the measurement platform 2 in a manner such that its centre of gravity runs along the line 7. Additionally, an additional mass 8 is arranged on or at the measurement platform and is moved in a manner until the centre of gravity lies directly above the bearing arrangement 3, in order to achieve a precise adjustment of the centre of gravity above the joint arrangement 3.

In the present embodiment, the restoring elements 4 are tension springs. If the measurement platform is knocked, for example in the drawn z-direction, then the measurement platform 2 oscillates about the rotation degrees of freedom of the x-axis and y-axis, since the bearing arrangement 2 permits the movement in two degrees of freedom, as is schematically represented. As will be explained in more detail by way of the following embodiment examples, the bearing arrangement 3 can also be designed in a manner such that it can be moved in up to five degrees of freedom (then preferably three rotation degrees of freedom and two translatory degrees of freedom in the x-direction and y-direction). A periodic or repeated excitation of the system is not necessary. The restoring elements which are designed as tension springs in the drawn condition are located in the so-called zero position, in which the measurement platform is perpendicular to the z-direction. If the measurement platform is deflected out of this zero position, then the system begins to freely oscillate about the zero position. The natural frequencies and amplitudes of the system, which are effected by the free oscillations, together with the calibration matrix of the device 1 provide information on the nature of the inertia characteristics of the object 6. The natural frequencies and/or amplitudes of the free oscillations can generally be measured.

Figures 2A, 2B:
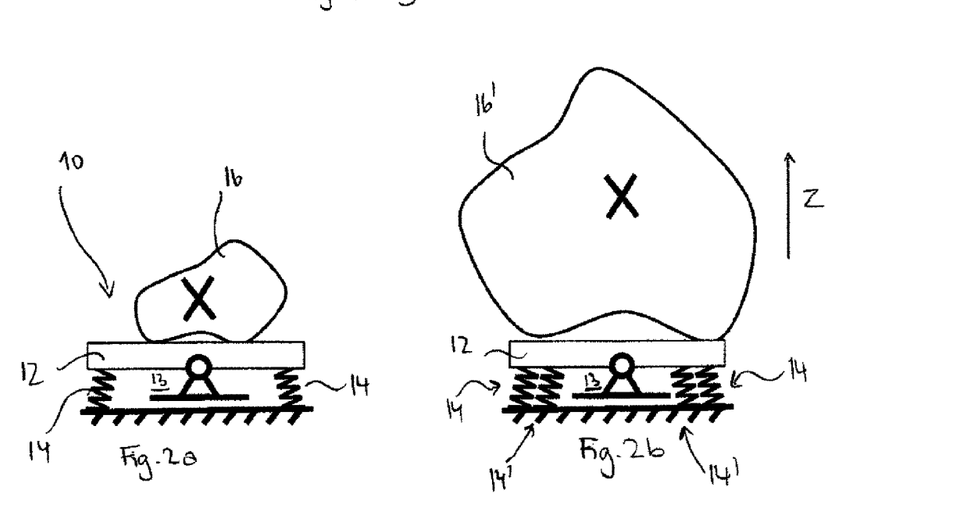
FIGS. 2a and 2b an illustration of an embodiment of compression springs, and the adaptation possibilities of the device.

The adaptation possibilities of the device are dealt with in the FIGS. 2a and 2b. The same device 10 with a measurement platform 12 and with a bearing arrangement 13 which is identical in each case is represented in each of the FIGS. 2a and 2b An object 16 which compared to the object 16' of FIG. 2b has a smaller mass and in the z-direction has a lower centre of gravity and smaller dimension is held on the platform 12 in FIG. 2a. With the represented restoring elements, it is the case of compression springs 14 which are connected between the carriers 15 which is given by a mount which is not drawn in more detail. In this embodiment, the restoring elements 14 are not connected to the bearing arrangement 13. Identical restoring elements 14' which increase the total stiffness of the device 10 compared to the embodiment example represented in FIG. 2a are additionally added to the restoring elements 14, in order to adapt the device 10 for the measurement of a larger object 16'. In this manner, the system can be adapted to the object to be measured and be accordingly scaled. The restoring elements are preferably inserted, screwed or hooked, into an adapter. The natural frequencies of the system can be reduced by way of this and preferably minimised, without compromising the stability of the system. Particularly elastic bodies can be measured by way of this.

The measurement platform is arranged above the carrier in FIGS. 2a and 2b. In this manner, is possible, as is represented in FIG. 2b for example, to measure an object 16' which has dimensions projecting beyond the measurement platform 12.

Figure 3A:
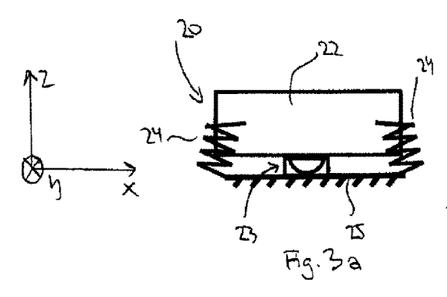
FIGS. 3a to 3c embodiments of a bearing arrangement and/or joint arrangement.
Figure 3B:
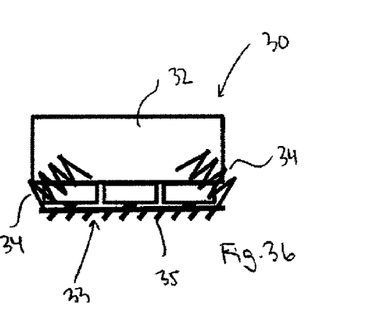
Figure 3C:
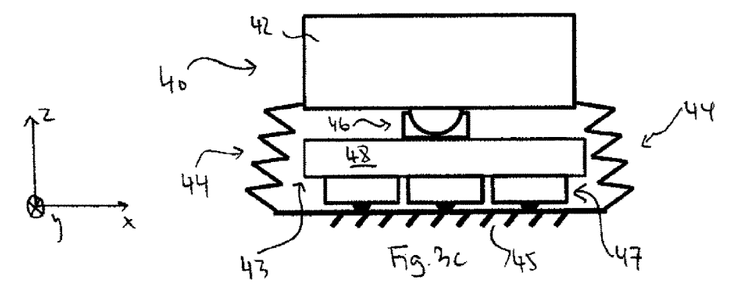

As to how different bearing arrangements and/or joint arrangements can guide a movement in a multitude of degrees of freedom of the measurement platform is to be explained by way of FIG. 3.

A device 20 which comprises a measurement platform 22, a bearing arrangement 23 and restoring elements 24 designed as compression springs is shown in FIG. 3a. The bearing arrangement 23 and in each case an end of the restoring elements 24 is connected to a frame 25 serving as a carrier. With the bearing arrangement 23, the bearing has a spherical air bearing, so that the measurement platform can be moved in three rotation degrees of freedom about the x-axis, y-axis and z-axis. The measurement platform 22 can move in these three rotation degrees of freedom with respect to the carrier, when the measuring platform 22 is deflected into free oscillation. Other spherical bearings, such as oil-mounted spherical forms, universal (cardan) joints (with two degrees of freedom about the x-axis and y-axis) or likewise can also be applied alternatively to the spherical air bearing. The spherical air bearing although being comparatively expensive, however has a very good (i.e. low) friction, which is to say that the measurement platform can be oscillated about the two rotation degrees of freedom essentially without friction.

A device 30 with a measurement platform 32, as well as a bearing arrangement 33 and restoring elements 34 is shown in FIG. 3b. A carrier 35 is moreover present. The measurement platform 32, the restoring elements 34 as well as the carrier 35 can be compared to the elements described in FIG. 3a. The bearing arrangement 33 comprises at least one plane air bearing which has a high stiffness and permits translatory movements within the x-y plane. Moreover, it permits a movement about the z-axis, so that the represented bearing arrangement 33 permits the movement of the measurement platform with respect to the carrier in three degrees of freedom. In the present embodiment, the bearing arrangement 3 comprises plane air bearings which are arranged at regular distances on the lower side of the measurement platform 32 which faces the carrier.

The bearing represented in FIG. 3a as well as the bearing represented in FIG. 3b is operated by way of compressed air. The carrier in many embodiments comprises compressed air feeds conduits for this, and these for example can be connected to an internal or external compressor. In a variant, the arrangement of FIG. 3a can be arranged on an arrangement of FIG. 3b, wherein the measurement platform which is mentioned in the description concerning FIG. 3b would then be the carrier of the total arrangement, and the carrier mentioned in the description concerning FIG. 3b would be the further carrier. The carrier mentioned in the description concerning FIG. 3a would then correspond to the measurement platform of FIG. 3b. The restoring elements of the total arrangement would independently run between the further carrier and the carrier, as well as between the carrier and the measurement platform.

A device 40 which comprises a measurement platform 42, a bearing arrangement 42, restoring elements 44 and a carrier 45 is shown in FIG. 3c. The bearing arrangement 43 comprises a spherical bearing 46 as is described in the context of the bearing arrangement 23 of FIG. 3a. The bearing arrangement 43 moreover comprises a plurality of plane air bearings 47 as described within the framework of FIG. 3b. The bearing arrangement 43 combines the spherical bearing 46 and the plane air bearing 47 into a single bearing arrangement. In the present embodiment example, the spherical bearing 46 connects the measurement platform 42 to an intermediate pate 48 of the bearing arrangement 43. The plane air bearings 47 are arranged on the lower side of the intermediate pate 48 and permit a movement along the x/y plane. The measurement platform 42 can now be moved in three rotation degrees of freedom and in two translatory degrees of freedom within the x/y-plane due to the combination of the spherical bearing 46 and the plane air bearing 47. If the measurement platform 42 is deflected, then the measurement platform oscillates about a zero position due to the restoring elements and can execute movements in the five above mentioned degrees of freedom.

An evaluation of the inertia characteristics of the object to be measured is possible in a single measurement, for example from the measurement of the natural frequencies and the oscillation shapes. It is to be noted here, that although the device until now has been mentioned in combination with a carrier, in one embodiment the device can also be understood to the extent that this only encompasses restoring elements which are connectable to a carrier, and the bearing arrangement is likewise connectable to the carrier. Thus for example the unit shown in FIG. 3c already forms independent subject-matter of the application, independently of the applied bearing arrangement.

Further variants of bearing arrangements are to be explained by way of the FIG. 4. A device 50 which comprises a measurement platform 52, a bearing arrangement 53 as well as restoring elements 54 is disclosed in FIG. 4a. The same arrangement is represented rotated by 90° about the z-axis in FIG. 4b. As is shown in FIG. 3c, the bearing arrangement 53 comprises a multitude of plane air bearings 55 which permit a sliding of the measurement platform 52 on the carrier. The plane bearings are connected to an intermediate plate 56. A further bearing arrangement 57 which permits a movement in the two rotation degrees of freedom about the x-axis and y-axis is arranged on the intermediate plate. The bearing device 57 comprises a first half-cylinder 59 which extends along the y-axis, and which is arranged with its flat side on the measurement platform 52. The half-cylinder is thus suitable for permitting a movement of the measurement platform about the y-axis. This can be schematically seen in FIG. 4c, with which on the one hand the cylinder 58 is represented in the zero position (cylinder marked with an unbroken line) and deflected out of the zero position (cylinder marked with dashed line). The cylinder 58 is arranged on a plate 59 which for example is a ground or hardened plate. A further half-cylinder 60 which extends along the x-axis is arranged on the lower edge of the plane. Although not being absolutely necessary, for the purpose of simplicity it is assumed that the half-cylinder with its flat side is arranged on the lower side of the plate 59 and has a length comparable to the cylinder 58 and a comparable radius of curvature. The half-cylinder rolls on the plate 59 if the flat side of the half-cylinder is arranged on the plate 56, so that only this plate 59 needs to be hardened.

Figures 4A, 4B, 4C:
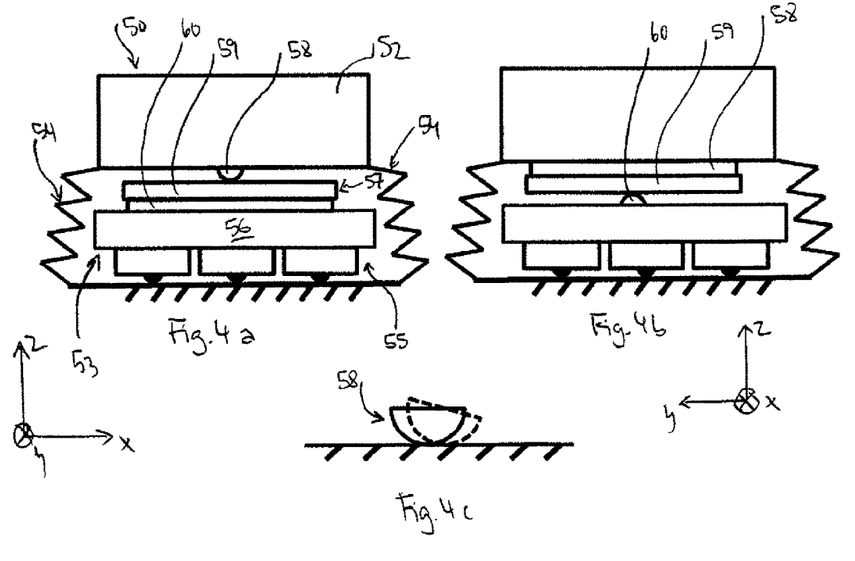
FIGS. 4a to 4h further embodiments of a bearing arrangement and/or joint arrangement.

The movement about the cylinder 60 permits a rotation of the measurement plate 52 about the x-axis. Thus the bearing arrangement 57 permits a movement about the two rotation degrees of freedom x and y. Oval or ellipsoidal shapes or several half-spheres arranged in a row can be selected instead of the circular cylinder shape. The bearing arrangement 57 has huge advantages compared to blade bearings, since the surface pressing of the bearing arrangement is significantly reduced compared to blade bearings. The rolling behaviour of the half-cylinder is modelled in the measurement algorithm.

Hardened metals, ceramics or diamond-like composite materials are considered as materials for the bearing arrangement 57. The basic principle of the half-cylinders (or other arcuate shapes) arranged on one another in the bearing arrangement corresponds to that of a universal joint, since it permits a rotation about two rotation degrees of freedom. The bearing arrangement 57 can also be applied without a further plane bearing, as an independent bearing arrangement, in a device according to the application.

Figure 4D:
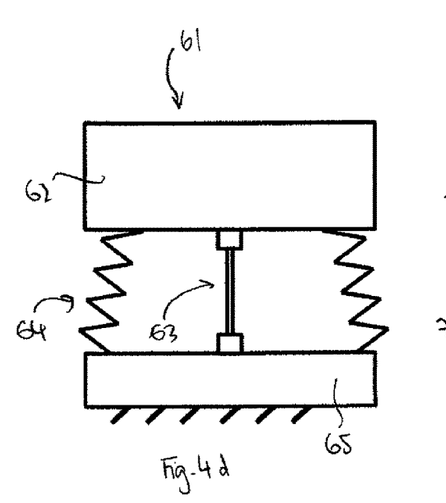

FIGS. 4d to 4h show further bearing arrangements. A device 61 with a measurement platform 62, a bearing arrangement 63, restoring elements 64 and a carrier frame 65 is represented in FIG. 4d. The restoring elements connect the lower side of the measurement platform to the upper side of the carrier frame 65. The same applies to the bearing device 63 which supports the measurement platform 62 in its middle, which is to say its centre of gravity. With the bearing arrangement 63, it is the case of an elastic rod, which permits the three rotation degrees of freedom and translatory movements of the x/y plane. The rod is connected to the measurement platform and the carrier without further joints. One advantage of this solution is the simple design of the bearing arrangement 63, with which however movements in up to five decrees of freedom are mad possible, but a disadvantage is the fact that one must fall back on an adapted calibration method. Metals, plastics or composite materials are considered as a material for the rods.

Figure 4E:
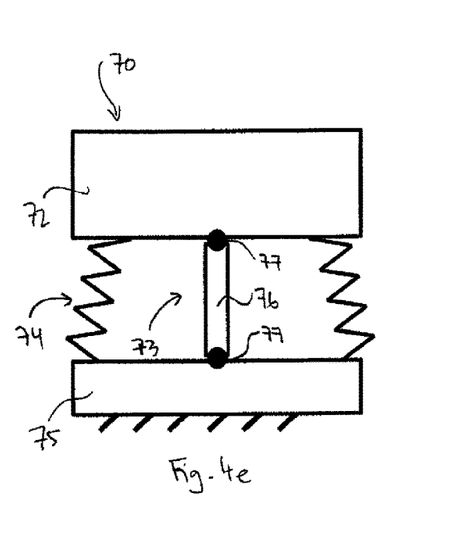

A device 70 which similarly to the FIG. 4d comprises a measurement platform 72, a bearing arrangement 73, restoring elements 74 and a carrier frame 75 is represented in FIG. 4a. The carrier frame 75 is thereby stationary with respect to the floor and cannot move along this. The bearing arrangement 73 comprises a rigid rod 76 which is connected to the measurement platform or the carrier frame via two ball joints 77 and 78. A movement in five degrees of freedom is possible in this manner. One advantage of this solution is the simple construction of the bearing arrangement, but a disadvantage however is the fact that the geometric stiffness of the bearing arrangement must be taken into consideration.

Figure 4F:
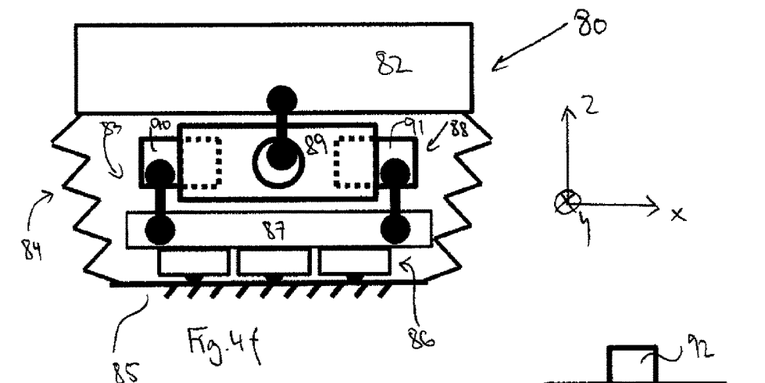
Figure 4G:
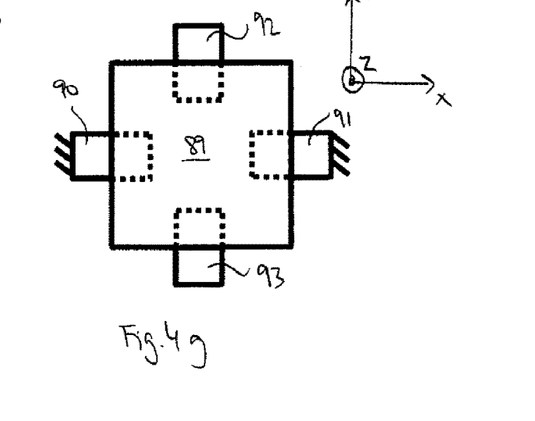

A further embodiment of a device is represented in FIG. 4f. The device 80 comprises a measurement platform 82, a bearing arrangement 83, and restoring elements 84 which are connected to the floor 85. The bearing arrangement 83 comprises a multitude of plane air bearings which permit a movement of the measurement platform 82 with respect to the base 85 in the x/y direction and about the z-axis. The bearing arrangement moreover comprises a plate 87, on which a further bearing arrangement 88 is placed. The bearing device 88 is a bearing based on flexure hinges. The bearing arrangement 8 thereby comprises a plate 89, in which four flexure hinges 90 to 93 are arranged in the present embodiment example, as is also shown in FIG. 4g. Thereby, the flexure hinges 90 and 91 are connected to the plate 87 via bearing blocks, and the flexure hinges 92 and 93 are connected to the measurement platform 82 via rods. A movement about the y-axis is possible about the joints 92 and 93, and a movement about the x-axis is possible about the joints 90 and 91. As flexural hinges, one can for example fall back on so-called "flexural pivots" which comprise a casing divided into two parts and the two casing parts can be twisted to one another via a mechanism.

Figure 4H:
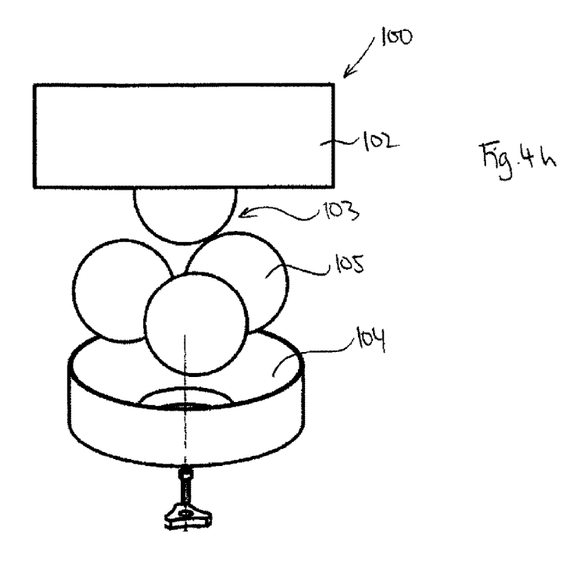

A further alterative of a bearing arrangement is schematically represented in FIG. 4h. A spherical cap 103 which is mounted on three balls 105 held in a spherical-segment-shaped shell 104, is arranged on a measurement platform 102, at the lower end. The platform can thereby undergo a movement about the three rotation degrees of freedom. The hemispherical shell 104 can thereby be arranged on a further plate, on which an additional bearing device for the movement within the plane is arranged, or can be assembled directly on a carrier.

Further bearing arrangements are possible, although a multitude of possible bearing arrangements has already been discussed. Thus for example the half-cylinder explained in FIG. 4a can be replaced in each case by a multitude of hemispheres or mounted solid balls. Moreover, the cylinder could be replaced by a radial segment air bearing. Moreover, the different represented bearings can be combined with one another in a manner such that a movement of the measurement platform with respect to the carrier is possible in two to five degree of freedom in each case.

A mechanism for the adjustment of the device is explained by way of FIG. 5. A detail of the arrangement represented in FIG. 4a (and FIG. 4b) is shown in the FIG. 5. FIGS. 5a and 5c, as well as 5b and 5d in each case show representations of a device for determining inertia characteristics, in each case rotated by 90° about the z-axis. The measurement platform 52 is arranged on a bearing arrangement 57 which, as described in FIG. 4, comprises a cylinder 58, a ground plate 59 and a second cylinder 60 which is arranged at a 90° angle to the first cylinder 58. The cylinder 60 rolls on a further plate 56. Although the measurement platform 52 in the ideal case only carries out rolling movements about the zero position, a lateral offset for example of the cylinder 58 with respect to the plate 59 can occur. The device comprises a mechanism 110 for the adjustment of the measurement platform 52 in the zero position, in order to carry out a hardware calibration of the device before a measurement. The adjustment can be carried out for example by way of at least one, preferably two ball heads 111 and a corresponding device 112 for engaging upon the ball head. The device 112 for example can have a cone shape which engages on the ball head for the self-adjustment of the measurement platform. A force is firstly exerted upon the left side of the measurement platform 52 for the calibration of the device. By way of this, the device 112 lowers onto the ball head 111 until the cylinder 58 releases from the plate 59. One succeeds in the measurement platform 52 being aligned with respect to the plate 59 and the plate 56 due to the calibration of the device on the ball head. This can be recognised in FIG. 5b for example.

Figure 5A:
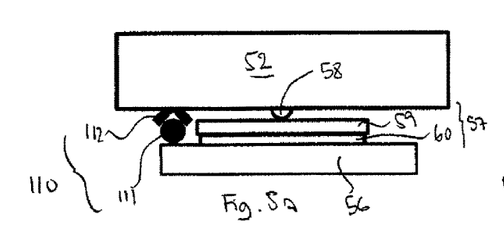
FIGS. 5a to 5d embodiments of a device with an adjustment mechanism.
Figure 5B:
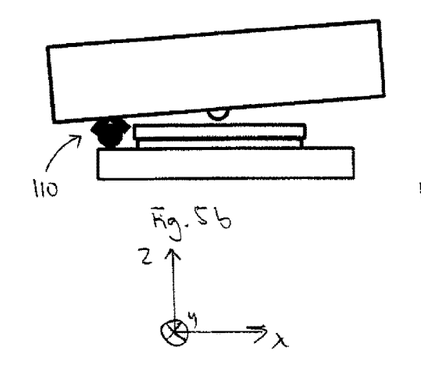
Figure 5C:
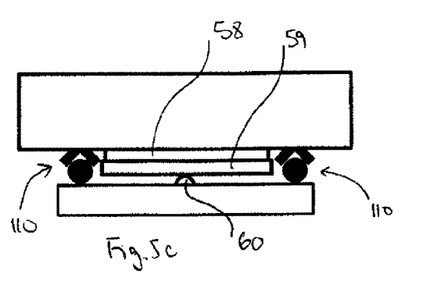
Figure 5D:
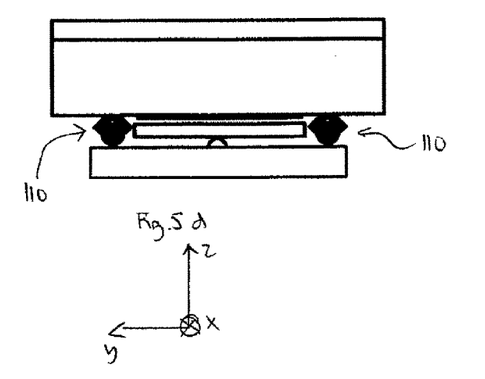
Figure 6A:
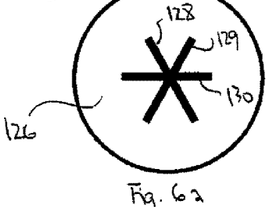
FIGS. 6a to 6d further embodiments of a device.
Figure 6B:
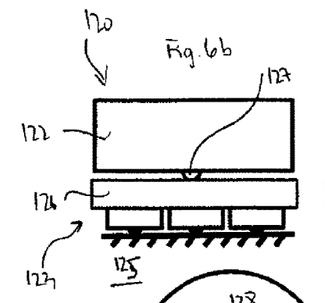
Figure 6C:
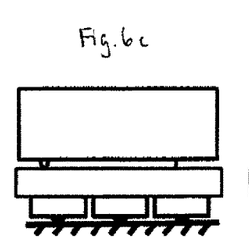
Figure 6D:
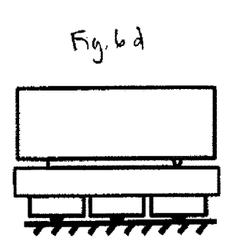

It can be clearly recognised by way of the FIGS. 5c and 5d that the device for adjustment 110 also effects an alignment along the y-axis, since a plurality of devices, in this case two devices are present. Likewise recognisable in FIG. 5d is the fact that an adjustment of the bearing device 57 is achieved by locking the devices 112 on the ball heads 111. The measurement platform is calibrated with respect to the plate 56 and the measurement can be initiated.

A further variant of a device is to be explained by way of FIG. 6. The device 120 comprises a measurement platform 122, a bearing device 123 as well as restoring elements 124 which are not represented in more detail. The bearing device 123 apart from a plane bearing 125 comprises a plate 126, on which a single cylinder 127 lies, so that a rotation about an axis is possible. A plan view of the plate 126 is represented in FIG. 6a. Three grooves 128, 129 and 130, in which the cylinder 120 is held can be recognised. Now, in FIGS. 6b to 6d, the cylinder 127 is successively arranged in the grooves 128, 129 and 130, so that in each case different degrees of freedom of the object which is stationarily fixed with respect to the measurement platform 122 can be excited into oscillation. All inertia characteristics of the object to be measured can be analysed bit by bit on account of this.

Figure 7A:
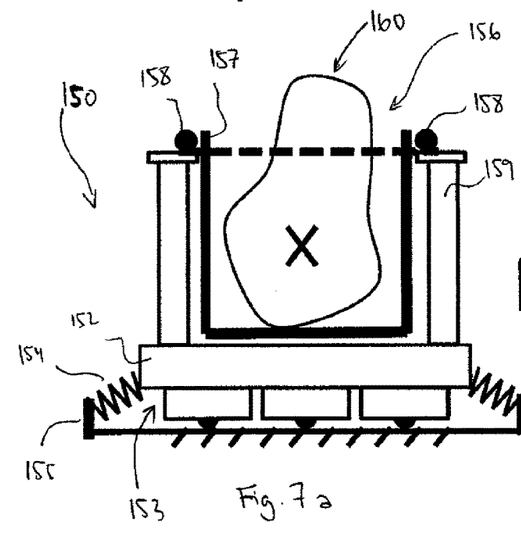
FIGS. 7a and 7b embodiment of a device with a gravity pendulum arrangement.
Figure 7B:
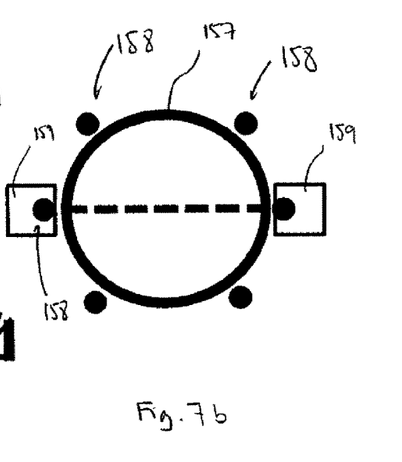

A further variant of a device 150 is represented in the FIGS. 7a and 7b. The device comprises a measurement platform 152, a bearing device 153 as well as restoring elements 154 which are fastened on a carrier 155. With regard to the bearing arrangement, it is the case of plane air bearings which permit a movement within the x/y plane and a rotation about the z-axis. Additionally, a gravity pendulum arrangement 156 is arranged on the measurement platform 152, with which arrangement an adapter 157 can be pendulated at two suspension points 158 on suspension surfaces 159 of the measurement platform, about a pendulum axis which is drawn as a dashed line. A rotation of the body 160 to be measured, for example about the x.-axis is possible due pendulating movement. Thus a measurement of four degrees of freedom can be carried out simultaneously with the present device. The suspension points 158 are designed as ball caps. The contact surfaces 159 as well as the multitude of suspension points 158 are represented in FIG. 7b. A rotation of the adapter 157 clockwise or anticlockwise can now be carried out, in order to suitably measure the body 160, so that different contacts points come to lie on the contact surfaces 159. A complete measurement of the object is possible in this manner.

A further embodiment of a device is to be explained by way of FIG. 8. FIG. 8a shows a device 200 in a lateral view, whereas FIG. 8b shows a section through the device 200. FIGS. 8c and 8d show different detailed views of the device 200.

Figure 8A:
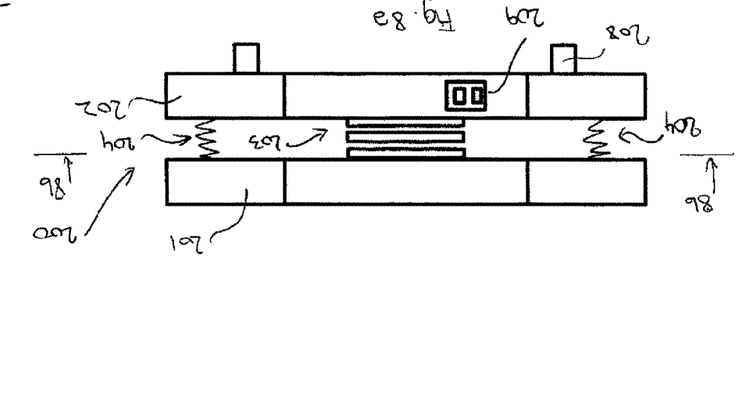
FIGS. 8a to 8d further embodiments of a device.
Figure 8B:
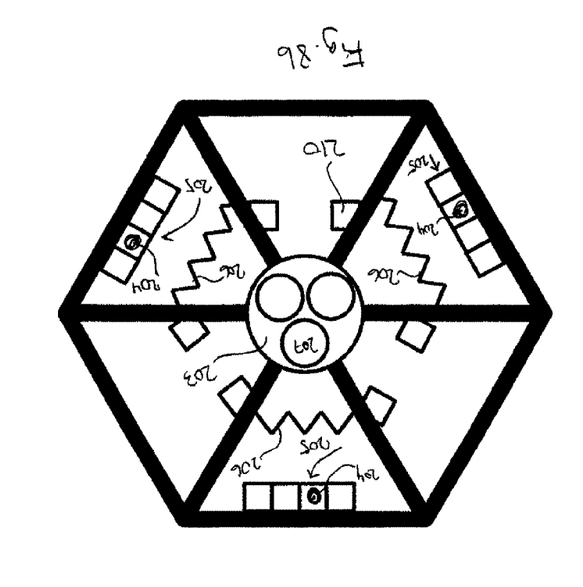
Figure 8C:
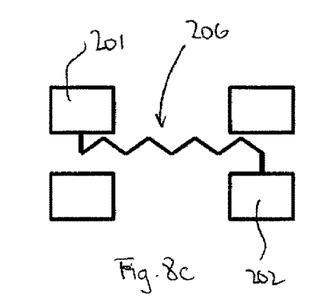

The device 200 comprises a measurement platform 201 and a carrier 202, wherein the measurement platform 201 and the carrier 202 in each case are a six-cornered metal mount with struts to the middle point of the hexagon. A bearing device 203 which can comprise different bearings or joints, in order to permit a movement of the measurement platform 201 with respect to the carrier 202 in two to five degrees of freedom is present between the measurement platform 201 and the carrier 202. Further restoring elements 204 and 206 are present, in order to counteract a deflection of the measurement platform 201. The restoring elements 204 belong to a first group of restoring elements which essentially accommodate vertically acting forces between the carrier and the measurement platform. With regard to the restoring elements 204, it is the case of compression springs which are connected in each case to the carrier and the measurement platform, i.e. the restoring elements are arranged on the carrier and the measurement platform in a direct manner. The carrier as well as the measurement platform moreover comprises an adapter 205, into which additional restoring elements can be hung/suspended. Only one restoring element is present for each adapter 205 in the represented case, wherein the total stiffness of the device or of the restoring elements can be adapted by way of simply adding or additionally suspending further restoring elements. The adding of restoring elements accommodating vertical forces also permits the measurement of objects with a relatively high centre of gravity.

The restoring elements 206 form a second group of restoring elements which here are designed as tension springs. The restoring elements 206 run essentially horizontally such as can be recognised by way of FIG. 8c for example. Thereby, the second group of restoring elements 206 accommodate forces acting essentially in the plane, between the measurement platform 21 and the carrier 202. Restoring forces can be provided for example with translatory movements or a rotation about the z-axis.

Figure 8D:
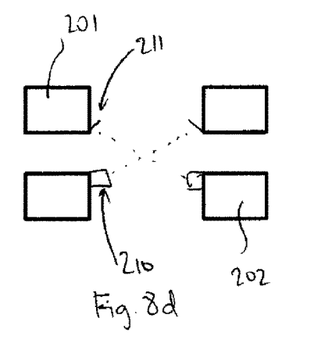

The bearing device 203 permits a movement about five degrees of freedom. Only plane air bearings 207 are represented in the section of FIG. 8b, wherein the device moreover comprises two cylinders rolling on one another, as is show in FIG. 4a. The carrier 202 moreover comprises height-adjustable feet 208, in order to effect an alignment of the carrier parallel to the plane. Thereby, the feet for example can be adjusted in their height by way of screwing in or out. The device 200 moreover comprises a data bus or an air feed 209, which is connected to the bearing device 203 as well as the sensors 210. The device can be connected via the data bus 209 to a data processing installation which evaluates the data detected by the sensors 210 and thus determines the inertia characteristics of the object to be measured. With regard to the sensors 210, it is the case of laser distance sensors which for example with the help of mirrors 211 as represented in FIG. 8d, carry out distance measurements and thus render the movement of the measurement platform 201 with respect to the carrier 202 detectable. An object can be completely measured from an evacuation of the frequencies. However, other surfaces can also be applied, e.g. surfaces of aluminium or matt, non-mirroring surfaces, alternatively to the mirrors.

Further sensors are conceivable despite the fact that only distance sensors for detecting the frequency are used in the present embodiment. Force sensors can also be used despite the fact that they are more complicated, but this is not envisaged in numerous embodiments.

Figure 9:
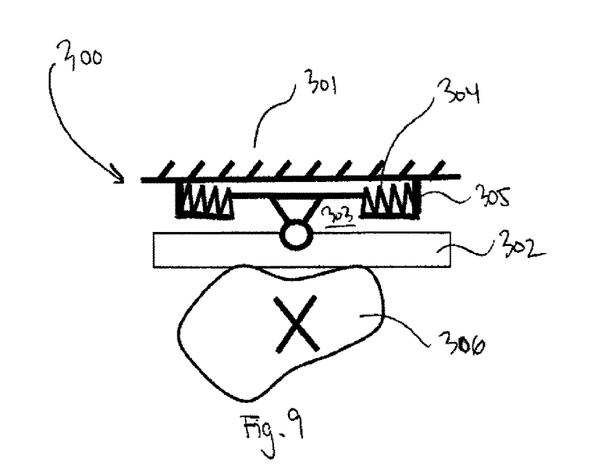
FIG. 9 an embodiment of a device according to the second aspect of the application.

A further embodiment of a device is to be illustrated by way of FIG. 9. With regard to the device 300, a carrier 301 which can be formed by a mount or for example a room ceiling is present. The device 300 moreover comprises a measurement platform 302, on which an object 306 to be measured can be suspended. The measurement platform 302 is connected to the carrier 301 via a bearing arrangement and/or joint arrangement 303 and via restoring elements 304. A movement along the z-axis is not possible since the restoring elements or the bearing arrangement 303 are or is led in guides 305, but the bearing arrangement is movable within the x/y plane and can carry out a rotation about the z-axis. With regard to the bearing arrangement itself, it is the case of a universal joint which permits the movement about two rotation degrees of freedom. In the present embodiment example, one can make do without restoring elements between the measurement platform 302 and the carrier 301 since the restoring elements 304 counteract a movement within the x/y plane or a rotation about the z-axis of the bearing device 303 and the centre gravity on pendulating the measurement platform 302 about two degrees of freedom of the bearing arrangement 303 forms a "restoring force".

As to the nature of the bearing arrangement 303, this can be essentially analogously deduced from the bearing arrangements of the preceding embodiment examples. Thereby, cardanic bearings can be applied. The plane bearings can also be applied. With regard to the device 300 it is therefore essentially the case of a gravity pendulum, with which the suspension point can be moved by up to three degrees of freedom.

Figure 10A:
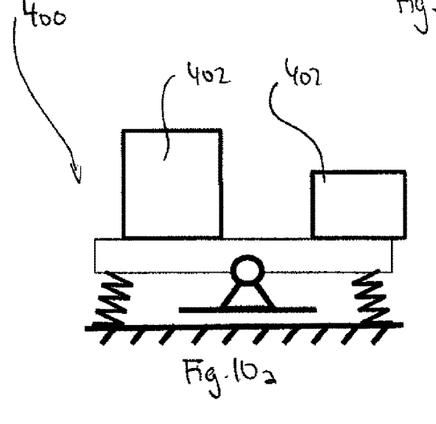
FIGS. 10a/10b illustration of the calibration of a device according to the first or second aspect.
Figure 10B:
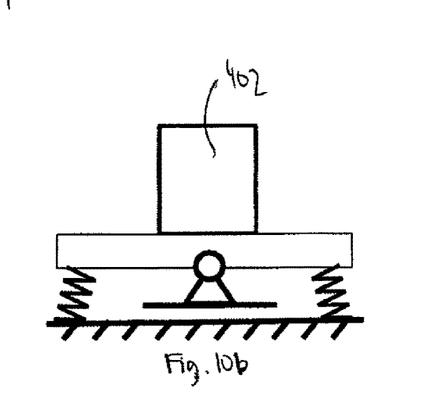

A calibration method is dealt with by way of FIGS. 10a and 10b. The device 400 corresponds essentially to one of the embodiment examples of the device as described beforehand. The total stiffness of the restoring elements as well as a mass matrix of the measurement platform and of the restoring elements can be precisely determined by way of the application of calibration masses 402. Different objects whose inertia characteristics are known are placed on the platform and inertia measurements carried out for this. The characteristics of the device are known after the total stiffness matrix and the mass matrix have been determined, as long as the object to be measured is placed on the platform in a manner such that its mass centre of gravity lies essentially precisely above the bearing arrangement and thus is carried or supported by this. The measurement platform with "real" measurements of an object thus has the same static zero position as with the calibration measurements.

The invention claimed is:

1. A device for determining inertia characteristics of an object, the device comprising:
    a carrier,
    a measurement platform arranged above the carrier and for the arrangement of the object, and
    a plurality of restoring elements are arranged between the measurement platform and the carrier,
    wherein the measurement platform is movable with respect to the carrier in up to five degrees of freedom and a bearing arrangement is arranged between the carrier and the measurement platform in a manner that permits a movement of the measurement platform with respect to the carrier in at least two degrees of freedom, and
    wherein the measurement platform is connected to the carrier via the restoring elements and independently of the restoring elements via the bearing arrangement and joint arrangement.

2. The device according to claim 1, wherein the bearing arrangement and/or joint arrangement is arranged in a manner that accommodates a static load of an object which is to be arranged on the measurement platform and is to be measured.

3. The device according to claim 1, wherein the plurality of restoring elements are spring elements.

4. The device according to claim 1, wherein the measurement platform is fixed with respect to the carrier in a vertical translatory direction of movement.

5. The device according to claim 1, wherein the plurality of restoring elements is larger than or equal to a number of degrees of freedom, in which the measurement platform is freely movable.

6. The device according to claim 1, wherein the plurality of restoring elements comprises a first and a second group of restoring elements, wherein the first group of restoring elements is arranged in a manner such that these predominantly accommodate vertical forces, and the second group of restoring elements are arranged in a manner such that these predominantly accommodate horizontal forces.

7. The device according to claim 1, wherein the carrier is arranged completely below the measurement platform.

8. The device according to claim 1, wherein the bearing arrangement comprises at least one spherical bearing, a torsion bearing, a ball bearing and/or a cardanic bearing, which is arranged in a manner such that the measurement platform can be moved in at least two degrees of freedom.

9. The device according to claim 1, wherein the bearing arrangement comprises a plane sliding bearing which is arranged in a manner such that the measurement platform is movable in at least three degrees of freedom.

10. The device according to claim 1, wherein the bearing device comprises a device for adjustment, so that the bearing arrangement can be fixed in a predefined position with respect to the carrier and/or the measurement platform.

11. The device according to claim 1, wherein the bearing arrangement is designed in a manner such that a centre of gravity of the measurement platform is supported by the bearing device.

12. The device according to claim 1, wherein a plurality of sensors is present, in order, by measurement, to detect a movement of the measurement platform with respect to the carrier, and are preferably arranged on the carrier, and preferably a data bus is present for coupling the device to a data processing installation, wherein data detected by the multitude of sensors is transferred from the respective sensor to the data bus.

13. A device for determining inertia characteristics of an object, the device comprising:
    a carrier,
    a measurement platform for arranging the object, and
    a bearing arrangement,
    wherein the bearing arrangement is arranged between the carrier and the measurement platform in a manner such that movement of the measurement platform with respect to the carrier is possible in at least one degree of freedom, that the carrier is arranged above the measurement platform and the measurement platform is designed in a manner such that the object is arranged below the measurement platform, and
    wherein the bearing arrangement is connected to the carrier via a plurality of restoring elements in a manner such that the bearing arrangement with respect to the carrier is movable perpendicular to a direction of the weight force, in two degrees of freedom.

14. A method for the calibration of a device according to claim 1, wherein a mass matrix of the platform and of the plurality of restoring elements and total stiffness matrix of the restoring elements are determined in a calibration measurement with a plurality of calibration objects with known inertia characteristics.

15. A method for determining the inertia characteristics of an object with a device according to claim 1, wherein the object is positioned on the measurement platform and an additional mass with known inertia characteristics is positioned on the measurement platform in a manner such that a common centre of gravity of the object and of the additional mass lies directly above or directly below the bearing arrangement.

* * * * *